Jan. 20, 1959

A. NITIKMAN 2,869,366

VORTEX FREQUENCY AIRSPEED INDICATOR

Filed March 21, 1955

To Frequency Meter
(Airspeed Indicator)

One Wave Length

INVENTOR:
Arthur Nitikman

By Herbert E. Metcalf
His Patent Attorneys

United States Patent Office

2,869,366
Patented Jan. 20, 1959

2,869,366

VORTEX FREQUENCY AIRSPEED INDICATOR

Arthur Nitikman, Inglewood, Calif., assignor to Northrop Aircraft, Inc., Hawthorne, Calif., a corporation of California Application March 21, 1955, Serial No. 495,624

1 Claim. (Cl. 73—181)

This invention relates to airspeed indicators and specifically to an instrument designed to measure the speed of an airplane through the air, although it is to be understood that the instrument is not necessarily limited to such use, for instance the speed of the wind over the roof of a building could be indicated by the instrument.

Experimental and theoretical analyses have demonstrated the fact that a body with a blunt base discharges a continuous series of vortices downstream when placed in a moving fluid such as a stream of air. This discharge is periodic in nature and the wave length between disturbances has been shown to be a function of the geometry of the body. Since the vortices move downstream at the free stream velocity, the frequency of these vortices produced in the airstream is proportional to the true airspeed. This phenomenon is well known with respect to circular cylinders for a wide variety of flow conditions, however experiments have indicated that there are sizeable non-linearities in the case of circular cylinders and hence they are not directly applicable. It appears that these non-linearities are due to the fact that the point of flow separation varies with flow conditions upstream.

It has been determined by experiment that the inconsistencies referred to may be overcome by employing sharp corners on the base of the body to fix the point of flow separation regardless of changes in the upstream flow conditions.

It is an object of this invention to provide an instrument incorporating the features of a body having sharp corners at its base, which is adapted for use as an airspeed indicator.

It is a further object of the invention to provide an instrument of simple and inexpensive construction which may be readily mounted in any position on a plane, building or other location where an undisturbed flow of air is obtainable.

Still further objects and features of the invention will hereinafter appear from the following specification read in conjunction with the accompanying drawings.

With these and other objects in view the invention comprises a blade-like member mounted vertically on the surface over which the speed of air is to be measured, said member having sharp corners at its rear edge to set up vortices in the slip stream, and sound pickup means mounted in said blade and connected to a suitable meter to count the sounds recorded by said pickup means.

Figure 1:
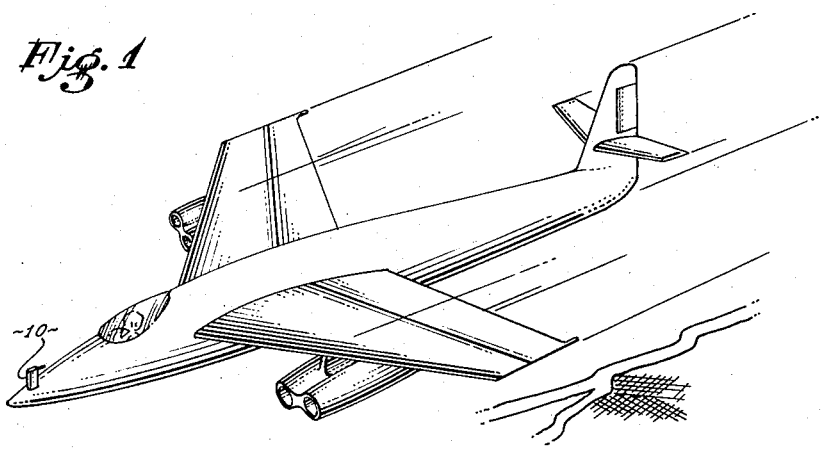
Figure 1 is a perspective view of an airplane fitted with the air speed indicating instrument of the invention located on the nose of the plane.
Figure 2:
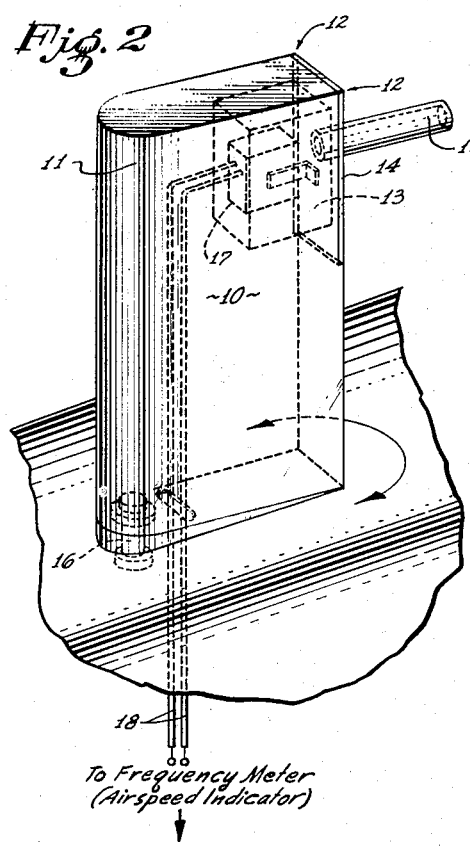
Figure 2 is a fragmentary view drawn on an enlarged scale showing details of the instrument and its installation.
Figure 3:
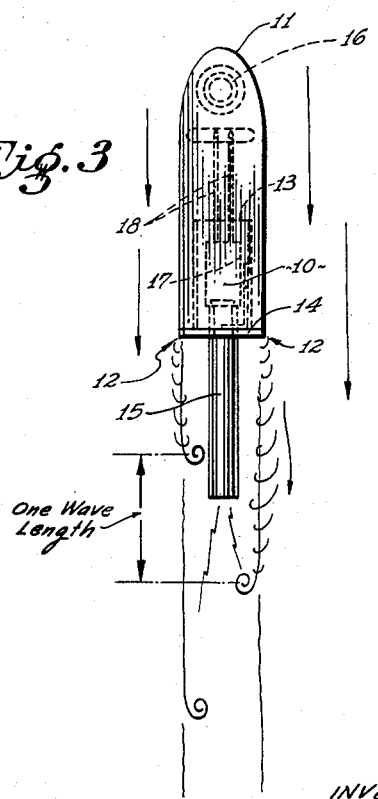
Figure 3 is a view of the instrument seen from above with the vortices formed by air flowing over the instrument in the direction of the arrows, diagrammatically illustrated.

The instrument comprises a blade 10 having a rounded or streamlined leading edge 11 and a square edged trailing edge 12. A chamber 13 is formed in the blade 10, the rear of the chamber being closed by a metal plate 14.

A sound tube 15 communicating with the chamber 13 is brazed or welded to plate 14 and projects rearwardly into the wake of the instrument to a distance equal to approximately twice the thickness of the blade.

The blade 10 is mounted on a vertical pivot 16 secured in the airplane structure so that the blade will always swing into the direction of the relative wind.

A microphone 17 is mounted within chamber 13 to pick up the pressure waves due to the formation of the vortices nearest to the rearward end of the tube, the sounds being conducted by the tube into the chamber, and the microphone transmitting the picked up sound signals through leads 18 to frequency measuring means (not shown) mounted in the plane, which means may include a frequency meter calibrated to read true airspeed in any desired units.

Wind tunnel tests have shown that the length between vortices is approximately five times the thickness at the base of blade 10. The wake frequency may therefore be calculated by the following relationship in which—

$f$ = cycles per second, and $\lambda$ = wave length
$t$ = thickness in inches
$V$ = velocity in miles per hour $$V = f\lambda \text{ or } f = \frac{V}{\lambda}, \text{ and } f = 3.5\frac{V}{t}$$

For airspeed ranges from 100 to 700 miles per hour this results in frequencies from 700 cycles per second to 4900 cycles per second. These frequencies are well within the audible range and since the intensities would be relatively high, it is possible to detect the fluctuations or vortices in the wake by means of the microphone.

It should be noted that if the sound intensities are too high for the microphone they may be attenuated by proper selection of the internal diameter of the tube 15.

The volume of the compartment in which the microphone is installed is selected by test to obtain a satisfactory resonant frequency for the instrument in order to eliminate the possibility of damage to the microphone resulting from a condition of resonance.

It should be noted that there are certain refinements to the instrument which could be employed should various difficulties arise, for instance if the instrument proves sensitive to the speed of the plane, sensitivity could be reduced by employing sweepback from base to top of the blade 10 and reducing the relative thickness of the instrument with respect to its chord.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

An airspeed indicator comprising: a generally air foil shaped member adapted to project into an airstream, said member being pivotally mounted adjacent the leading edge thereof to swing said member into the direction of said airstream, said member having a streamlined leading edge to separate said airstream and generate vortices, said member having sharp corners at the trailing edge thereof to discharge said vortices, sound conducting means mounted aft of said trailing edge rearwardly of said member and projecting into free space in the region of said vortices, a microphone in said member, said sound conducting means being conductively connected to directly transmit the sound produced thereon by said vortices to said microphone.

References Cited in the file of this patent

UNITED STATES PATENTS

| | | |
|---|---|---|
| 1,935,445 | Heinz | Nov. 14, 1933 |
| 2,055,370 | Wilhelm | Sept. 22, 1936 |
| 2,492,371 | Sivian | Dec. 27, 1949 |
| 2,519,015 | Bensen | Aug. 15, 1950 |